(12) United States Patent
Bucher et al.

(10) Patent No.: US 8,694,611 B1
(45) Date of Patent: Apr. 8, 2014

(54) PODCAST AUDIO DEVICES AND USER INTERFACES

(75) Inventors: Timothy Bucher, Los Altos, CA (US); Mark Andrew Ross, San Carlos, CA (US)

(73) Assignee: Dell Products L.P., Round Rock, TX (US)

( * ) Notice: Subject to any disclaimer, the term of this patent is extended or adjusted under 35 U.S.C. 154(b) by 1477 days.

(21) Appl. No.: 11/697,627

(22) Filed: Apr. 6, 2007

Related U.S. Application Data

(60) Provisional application No. 60/790,113, filed on Apr. 7, 2006.

(51) Int. Cl.
*G06F 15/16* (2006.01)

(52) U.S. Cl.
USPC .......................................................... 709/219

(58) Field of Classification Search
USPC ................................. 709/203, 206, 230–232
See application file for complete search history.

(56) References Cited

U.S. PATENT DOCUMENTS

| | | | | |
|---|---|---|---|---|
| 7,412,534 | B2 * | 8/2008 | Tsang et al. | 709/231 |
| 7,647,346 | B2 * | 1/2010 | Silverman et al. | 707/999.107 |
| 7,686,215 | B2 * | 3/2010 | Jones et al. | 235/380 |
| 2006/0168351 | A1 * | 7/2006 | Ng et al. | 709/248 |
| 2006/0265409 | A1 * | 11/2006 | Neumann et al. | 707/100 |

* cited by examiner

*Primary Examiner* — Scott Christensen
(74) *Attorney, Agent, or Firm* — Kirton | McConkie; Brian Tucker

(57) ABSTRACT

A system for providing simplified access to podcasts to a user includes one or more personal audio devices, a podcast directory service and one or more podcast sources. Each personal audio device can include a media player configured to play podcasts, a memory source capable of storing podcasts, a podcast directory of available podcasts and a podcast directory module configured to interface with the podcast directory service to receive podcasts for storage or delete podcasts from memory. The podcast directory service includes a mass storage device and a podcast upload module. The mass storage device can store podcasts, directories of podcasts available on the mass storage device or accessible podcasts sources, and a user profile. The podcast upload module is configured to interface with the personal audio device to coordinate the upload or deletion of podcasts from the personal audio device.

7 Claims, 1 Drawing Sheet

PODCAST AUDIO DEVICES AND USER INTERFACES

CROSS-REFERENCE TO RELATED APPLICATIONS

This application claims the benefit of U.S. Provisional Patent Application Ser. No. 60/790,113 filed Apr. 7, 2006, which application is incorporated herein by reference in its entirety.

BACKGROUND OF THE INVENTION

1. The Field of the Invention

The present invention relates generally to podcasting. More particularly, embodiments of the invention relate to systems and methods for providing simplified access to podcasts to a user of a personal audio device.

2. The Relevant Technology

Numerous forms of digital audio are proliferating today. As a result, there is an increasing need from new and improved portable media players to provide that content in an efficient manner to a user. Examples of portable media players are digital audio devices, often referred to as MP3 players, portable CD players, digital video players, portable game consoles, portable DVD players, notebook computers, FM and AM radios, satellite radio receivers, and the like.

One increasingly popular form of experiencing media is the podcast. A podcast is an audio file in a concise form, like an .mp3 or .WMA file, created in the form of a radio show with a way to subscribe to it so it can be automatically downloaded and delivered to a media player, like an iPod (from which the term "pod" originates). The audio file can then be listened to at the user's convenience.

A podcast can be easily created from a digital audio file. The podcaster first saves the digital audio file and then uploads it to the Web site of a service provider. The digital audio file gets its own URL, which is inserted into an RSS XML document as an enclosure within an XML tag. Once a podcast has been created, it can be registered with content aggregators for inclusion in podcast directories. People can browse through the categories or subscribe to specific podcast RSS feeds which will download to their audio players automatically when they next connect. Although podcasts are generally audio files created for digital music players, the same technology can be used to prepare and transmit images, text, and video to any capable device.

Content producers are increasingly turning to podcasting as an inexpensive and user-friendly new distribution channel that has the potential to reach a large audience. For example, musicians, music enthusiasts, traditional FM radio or television stations, even newspapers and other print media are beginning to venture into podcasting as well.

Because podcasting is such a new and popular media form, there is a continuing need for improved methods and systems to improve the functionality of podcasting.

BRIEF SUMMARY OF THE INVENTION

The present invention is generally directed to systems and methods for podcasting and, in particular, providing simplified access to podcasts to a user. According to embodiments of the invention, podcasts can be uploaded/downloaded from a podcast directory service and/or from other podcast sources, through a network, to a personal audio device of the user. Advantageously, the podcasts can be uploaded/downloaded to the personal audio device without the personal audio device being connected to a host computer.

The personal audio device comprises a media player configured to play podcasts, a memory source capable of storing one or more podcasts, and a podcast directory module configured to interface with a podcast directory service through a network. The podcast directory module is further configured to receive one or more podcasts for storage in the memory source and/or to delete one or more podcasts from the memory source.

The podcast directory service comprises a mass storage device and a podcast upload module. The mass storage device can store one or more of: one or more podcasts; a directory of podcasts on the mass storage device or other accessible podcast sources; and a user profile containing one or more of a list of desired podcasts, scheduled podcast programs, and user characteristics which the podcast directory service can use to predict podcasts of interest to the user. The podcast upload module is configured to interface with a personal audio device to coordinate the upload or deletion of podcasts from the personal audio device and to update a podcast directory on the personal audio device.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the figures wherein like structures will be provided with like reference designations. It is understood that the drawings are diagrammatic and schematic representations of presently preferred embodiments of the invention, and are not limiting of the present invention nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of communications systems, audio files, and personal audio devices have not been described in particular detail in order to avoid unnecessarily obscuring the present invention.

Figure 1:
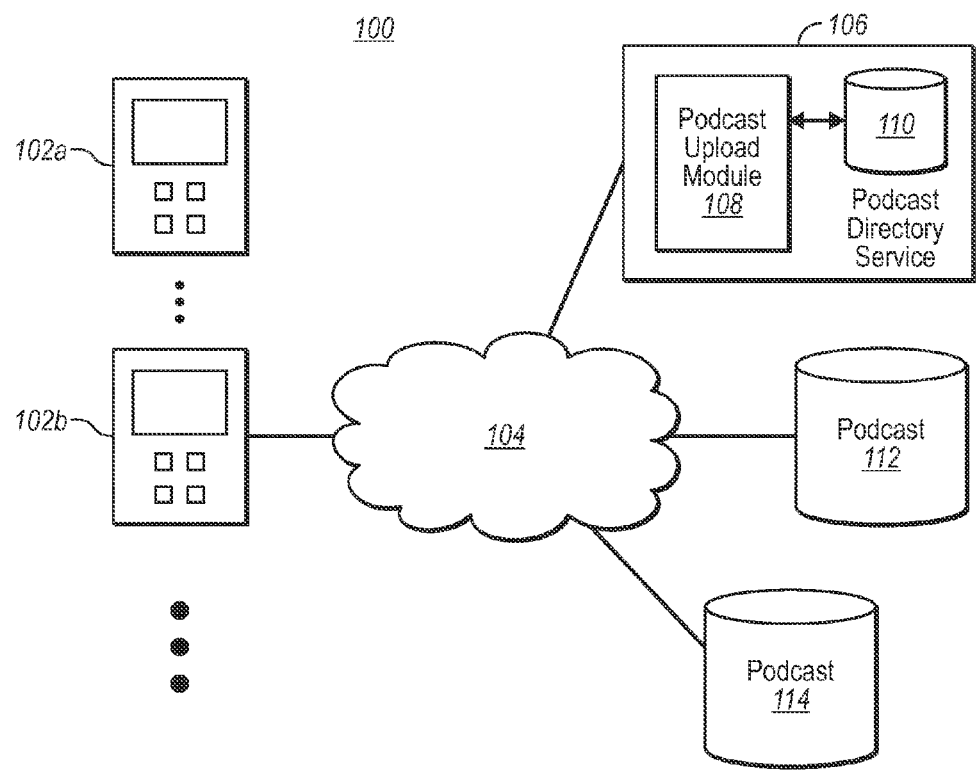
FIG. 1 illustrates an example podcast directory system of the invention in an exemplary environment in which embodiments of the invention can be practiced.

Embodiments of the invention include a system 100 for providing simplified access to podcasts for a user. With reference to FIG. 1, the system 100 generally includes a podcast directory service 106 connected to a data network 104, which can be for example the Internet, a satellite data service, or a cellular network. Also connected to the network 104 are one or more personal audio devices 102a, 102b that are configured to receive podcasts and a directory of podcasts from the podcast directory service 106 and play selected podcasts for a user. Because the personal audio devices 102a, 102b have been configured specifically for receiving and coordinating the use of podcasts, they allow a user to spend more time listening to audio content and less time searching for and managing audio files. Furthermore, the personal audio devices 102a, 102b can receive and coordinate the use of podcasts without connecting to a host computer, as required for conventional personal audio devices.

The podcast directory service 106 preferably includes a mass storage device 110 for storing: one or more podcasts; a directory of podcasts stored on the mass storage device or stored on other accessible podcast sources; and/or a user profile containing a list of desired podcasts, scheduled podcast programs, or user characteristics which the podcast directory service can use to predict podcasts of interest to a specific user. Optionally, the mass storage device 110 can also store a mixlist of podcasts. As used herein, a "mixlist" of podcasts is a play list of podcasts generated based on one or more user-specified preferences. For instance, a user listening to a particular podcast can indicate that they like the particular podcast and want more like it. The podcast directory service can then generate a mixlist of podcasts similar to the particular podcast.

The podcast directory service 106 may also include a podcast upload module 108 configured to interface with a podcast directory module 208 on a personal audio device 102 to coordinate the upload or deletion of podcasts from the personal audio device 102 and update a podcast directory on the personal audio device 102. The upload and download of podcasts can be based on user selections, on user-identified preferences, or computer-determined user preferences. For example, a user can create a list of twenty podcasts they would like to listen to and the system will remove listened-to podcasts and add new ones as space on the personal audio device permits. Alternately, the list of podcasts can be a mixlist generated by the podcast directory service based on user-identified preferences.

The podcast directory service 106 can receive and store original podcasts in the mass storage device 110, but may also search the Internet for podcast directories or podcasts from podcasts sources, for example podcast sources 112, 114, using a search module or other component configured to search the Internet. Once found by the search module, the podcast directory service 106 either stores the podcasts in the mass storage device 110 or stores the location and details of the podcasts in a directory. Portions of the directory can also be stored on the personal audio device, if desired.

Figure 2:
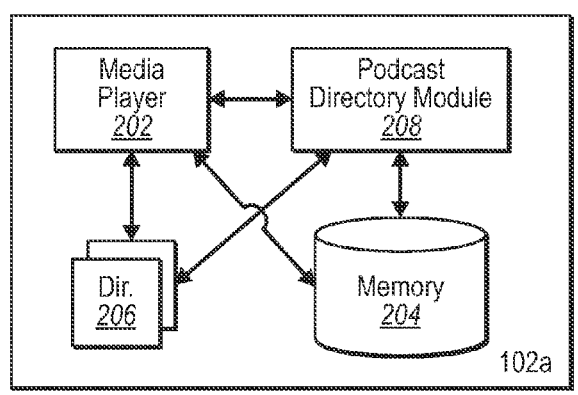
FIG. 2 illustrates one embodiment of a personal audio device.

Referring now to FIG. 2, an example personal audio device 102a includes a media player 202 for playing audio content for a user. While the media player 202 may be specially configured for playing podcasts, it can of course include modules and devices for playing other audio content such as satellite radio, FM and AM radio, and digital music. Podcasts and other audio content can be stored on a memory source 204, which at a minimum is capable of storing one or more podcasts.

The personal audio device 102a may also include a podcast directory 206 that lists podcasts available to the personal audio device 102a. The list can include podcasts stored on memory 204, as well as podcasts that have been indexed by podcast directory service 106. Podcasts listed in the podcast directory 206 that have not been uploaded to the personal audio device 102a but have been indexed by the podcast directory service 106 can be uploaded to the personal audio device after being selected by the user. In lieu of data stored on personal audio device 102, podcast directory 206 can represent a link to data stored at the podcast directory service 106.

A podcast directory module 208 is configured to interface with the podcast upload module 108 through network 104 to automatically receive one or more podcasts for storage in the memory source 204 or delete one or more podcasts from the memory 204. In addition to communicating with podcast upload module 108 to obtain podcasts and instructions for deleting podcasts, the podcast directory module 208 can be configured to interface with a user to obtain a list of desired podcasts or user preferences. Podcast directory module 208 can optionally also be used to access podcasts directly from podcast sources 112, 114 through the network 104.

The personal audio device 102a includes user interface devices for providing all the control necessary to operate the personal audio device. Such user interface devices can include a display or audio cues for communicating control data to a user as well as user input means such as a touchpad, buttons, scroll dials, switches, voice recognition modules, and the like. The display, for example, can be used to select a podcast from the memory 204 or from directory 206 to access a podcast via network 104.

The personal audio device 102 can communicate with the network 104 through any of a variety of systems/networking standards, including both wired and wireless systems/standards. Non-limiting examples include: cellular, 802.11, Bluetooth, USB cables, docking stations, and the like. Specific examples of cellular systems/standards include GSM, W-CDMA, GPRS and CDMA2000, amongst many others.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions include, for example, instructions and data which cause a general purpose computer, special purpose computer, or special purpose processing device to perform a certain function or group of functions. Although the subject matter has been described in language specific to content module features and/or methodological acts, it is to be understood that the subject matter defined in claims that may cover the present invention is not necessarily limited to the specific features or acts described above. Rather, the specific features and acts described above are disclosed as example forms of implementing claims that may cover the present invention.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network environment in which a plurality of podcasts are available, a system for providing simplified access to the podcasts to a specific user, the system comprising:
   (1) a handheld personal audio device comprising:
      a media player configured to play podcasts;
      a memory source capable of storing one or more podcasts;
      a podcast directory module, the podcast directory module configured to:
         automatically receive, through a network, one or more podcasts for storage in the memory; and
         receive an instruction, from the network, to delete one or more selected podcasts from the memory; and
      a podcast directory module, configured to interface with a podcast directory service to provide a listing of podcasts available to the personal audio device; and
   (2) the podcast directory service, located remotely from the handheld personal audio device, comprising:
      a mass storage device for storing:
         a directory of podcasts stored on the mass storage device and other accessible podcast sources;
         a search module configured to search the network for additional podcasts to include in the directory of podcasts; and
         a plurality of user profiles, each profile containing one or more of:
            a list of desired podcasts, scheduled podcast programs, and user characteristics which the podcast directory service can use to predict podcasts of interest to a specified user, wherein the plurality of user profiles includes a profile for the specific user; and
      a podcast upload module, the podcast upload module configured to interface with the podcast directory module to:
         automatically, based on the user profile of the specific user, upload podcasts to the memory on the personal audio device,
         allow the specific user to select additional podcasts to upload to the memory on the personal audio device, and
         detect when the specific user has listened to a previously uploaded podcast and, based on the detecting, delete the listened-to podcast from the memory on the personal audio device;
   wherein the podcast directory module interfaces directly with the podcast directory service, and wherein the network comprises the internet.

2. The system of claim 1, wherein the podcast upload module of the podcast directory service is further configured to update the podcast directory on the personal audio device.

3. The system of claim 1, wherein the podcast directory module is further configured to interface with one or more podcast sources through the network and thereby receive one or more podcasts for storage in the memory source of the personal audio device.

4. The system of claim 1, further comprising a plurality of personal audio devices, each personal audio device comprising a media player, a memory and a podcast directory module.

5. One or more non-transitory computer readable media storing computer executable instructions which when executed by one or more processors implement the following:
   a podcast directory service, located remotely from a personal audio device of a specific user, comprising:
      (1) a mass storage device for storing:
         a directory of podcasts stored on the mass storage device and other accessible podcast sources;
         a search module configured to search a network for additional podcasts to include in the directory of podcasts; and
         a plurality of user profile, each profile containing: a list of desired podcasts, scheduled podcast programs, and user characteristics which the podcast directory service can use to predict podcasts of interest to a specified user, wherein the plurality of user profiles includes a profile for the specific user;
      wherein the podcast directory service is configured to provide a listing of podcasts available to the personal audio device; and
      (2) a podcast upload module, the podcast upload module configured to interface with a podcast director module of the personal audio device to:
         automatically, based on the user profile of the specific user, upload podcasts to memory on the personal audio device,
         allow the specific user to select additional podcasts to upload to the memory on the personal audio device, and
         detect when the specific user has listened to uploaded podcast and, based on the detecting, delete the listened-to podcast from the memory on the personal audio device by sending an instruction over the network to the podcast directory module instructing the podcast directory module to delete the listened-to podcast;
      wherein the podcast directory service interfaces directly with the podcast directory module of the personal audio device, and wherein the network comprises the internet.

6. The podcast directory service of claim 5, wherein the mass storage device further stores a mixlist of podcasts generated by the podcast directory service based on one or more user preferences.

7. The podcast directory service of claim 5, wherein the upload or deletion of podcasts from the personal audio device is based on one or more of:
   the list of desired podcasts;
   user-identified preferences; and
   computer-determined user preferences.

* * * * *